R. NORRIS.
Lamp-Chimney.
No. 165,361. Patented July 6, 1875.
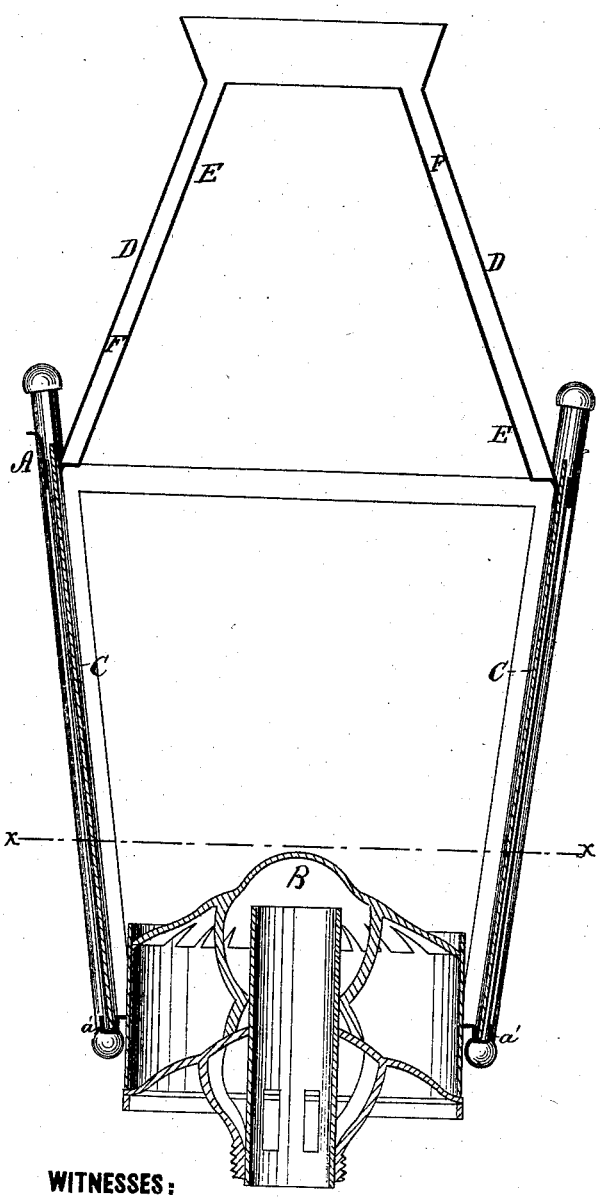
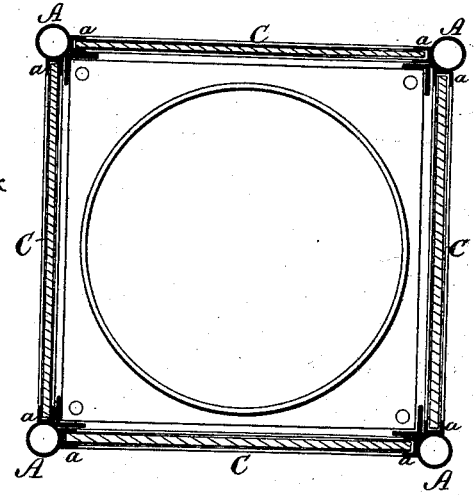
WITNESSES:
W. W. Hollingsworth
C. Solon @ Kenon
INVENTOR:
Robt. Norris
BY
Munn & Co.
ATTORNEYS.

UNITED STATES PATENT OFFICE.

ROBERT NORRIS, OF ANNA, ILLINOIS, ASSIGNOR OF ONE-HALF HIS RIGHT TO CORNWALL AND WALLACE KIRKPATRICK, OF SAME PLACE.

IMPROVEMENT IN LAMP-CHIMNEYS.

Specification forming part of Letters Patent No. 165,361, dated July 6, 1875; application filed March 16, 1875.

*To all whom it may concern:*

Be it known that I, ROBERT NORRIS, of Anna, in the county of Union and State of Illinois, have invented a new and Improved Lamp-Chimney; and I do hereby declare that the following is a full, clear, and exact description of the same, reference being had to the accompanying drawing forming a part of this specification, in which—

Figure 1 is a vertical, and Fig. 2 a horizontal, section.

The invention relates to chimneys for oil-lamps such as are made of metal with side glasses, an open top, and a base-rim that rests upon the burner.

The invention will first be fully described in connection with all that is necessary to a full understanding thereof, and then pointed out in the claim.

A represents the metallic frame, resting upon the burner B, and having the glasses C tapered and arranged to slide in tapering vertical grooves $a\ a$ and bottom grooves $a$. This allows the glasses to be raised from the outside with great facility and easily removed for replacement, while they are at the same time enabled by their taper to always tightly fasten themselves so as not to rattle when the lamp is handled. D is the converging top of chimney, on which the ascending products of combustion strike. This is likely to become very much heated, and to communicate its caloric to the glasses, thus tending to break them unless some preventive against the transmission of the absorbed heat is employed. For this purpose I provide a subsidiary bottom-closed flue, E, on the inside of top D, leaving a top-open air-chamber, F, between the two. This has the effect of producing a continuous circulation of air between the top and inside flue, and of carrying off the heat from the flue as fast as it is radiated. Thus is entirely removed any chance of fracture to the glasses from the heat.

Having thus described my invention, what I claim as new is—

The combination of tapering glasses with a frame having tapered grooves opening on the outside thereof, as shown and described, to allow the glasses to be entered or removed without separating the parts of frame.

ROBERT NORRIS.

Witnesses:
GEORGE W. NORRIS,
J. W. DONOVAN.